H. A. RIDLEY.
Improvement in Cotton Planters.
No. 132,984.          Patented Nov. 12, 1872.
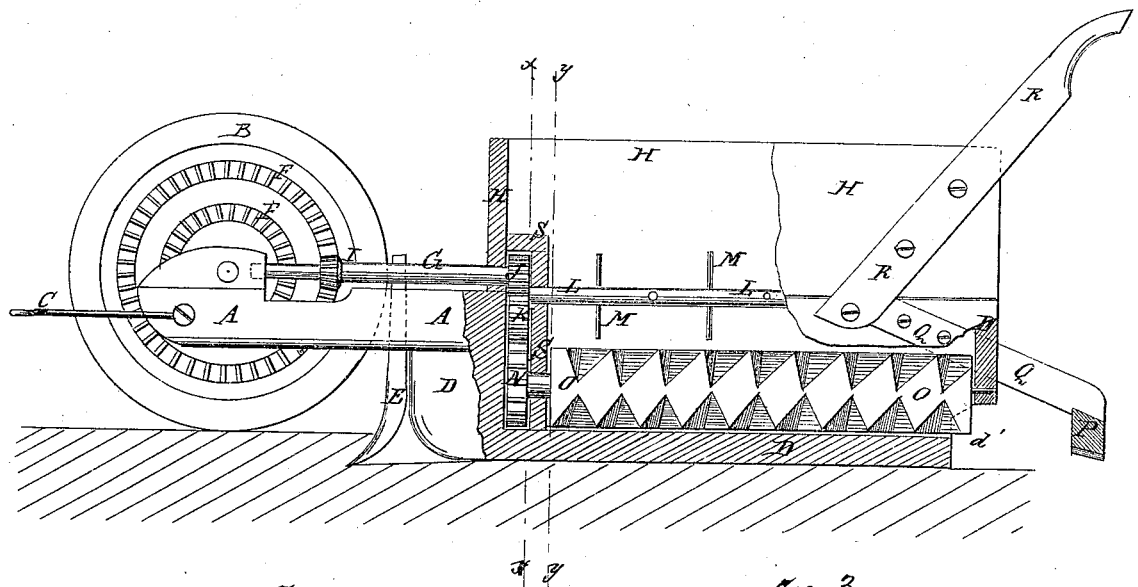
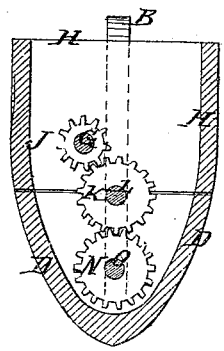
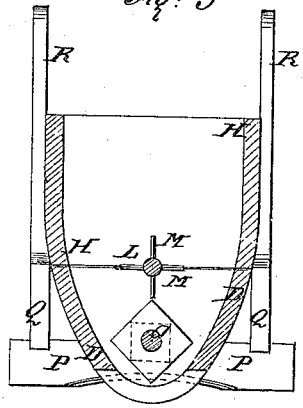
Witnesses:
Chas. Nida
C. Sedgwick
Inventor:
H. A. Ridley
per Munn & Co
Attorneys.

UNITED STATES PATENT OFFICE.

HENRY A. RIDLEY, OF JACKSONPORT, ARKANSAS.

IMPROVEMENT IN COTTON-PLANTERS.

Specification forming part of Letters Patent No. 132,984, dated November 12, 1872.

*To all whom it may concern:*

Be it known that I, HENRY A. RIDLEY, of Jacksonport, in the county of Jackson and State of Arkansas, have invented a new and useful Improvement in Seed-Planter, of which the following is a specification:

Figure 1 is a side view of my improved planter, partly in section to show the construction. Fig. 2 is a detail cross-section of the same taken through the line $x\,x$, Fig. 1. Fig. 3 is a detail cross-section of the same taken through the line $y\,y$, Fig. 1.

Similar letters of reference indicate corresponding parts.

My invention has for its object to furnish an improved seed-planter, designed especially for planting cotton-seed, and which shall be simple in construction, convenient in use, and reliable in operation; and it consists in the construction and combination of the various parts of the planter, as hereinafter more fully described.

A is the beam, in a slot in the forward part of which is pivoted the drive-wheel B, and to the forward end of which is pivoted the bail C, to which the draft is attached. To the rear end of the beam A is attached the body D of the planter, which is made somewhat in the shape of the hull of a ship, to adapt it to press open the furrow to receive the seed. To the rear part of the beam A, just in front of the body D, is attached a plow, E, to open the furrow. To the side of the drive-wheel B are attached, or upon it are formed, two concentric gear-wheels, F. G is a shaft, the forward end of which revolves in bearings attached to the beam A, and its rear end enters and revolves in the forward end of the body D, or of the hopper H, attached to said body. Upon the shaft G is placed a small gear-wheel, I, in such a way that it may be thrown into gear with the outer or inner gear-wheel F, according as a faster or slower feed is desired. To the rear end of the shaft G is attached a small gear-wheel, J, the teeth of which mesh into the teeth of the gear-wheel K, attached to the forward end of the shaft L, which extends longitudinally through the upper part of the body D, or the lower part of the hopper H, and has prongs, fingers, or teeth, M, attached to it to keep the seed stirred up so that it will not clog, and so that it will pass out freely. The teeth of the gear-wheel K also mesh into the teeth of the gear-wheel N, attached to the forward journal of the bar O, which extends longitudinally through the lower part of the body D. The bar O is made square, and its corners are notched spirally, as shown in Fig. 1, so that as it is revolved it may force the seed out gradually and uniformly through the opening $d'$ in the rear end of the body D. P is the covering-bar, the lower side of which is concaved to give the desired form to the top of the ridge or drill, and the ends of which are attached to the rear ends of the inclined bars Q, the forward ends of which are attached to the upper rear part of the sides of the body D. R are the handles, by which the planter is guided and controlled, the forward ends of which are attached to the sides of the hopper H and body D, either or both. The gear-wheels J K N should be covered and protected by a box or casing, S, as shown in Fig. 1.

Having thus described my invention, I claim as new and desire to secure by Letters Patent—

The beam A, drive-wheel B, body D, hopper H, opening-plow E, concentric gear-wheels F, adjustable gear-wheel I, shaft G, gear-wheels J K N, toothed-shaft L M, spirally-notched square bar O, coverer P Q, and handles R, constructed, arranged, and operating in connection with each other, substantially as herein shown and described, and for the purposes set forth.

HENRY A. RIDLEY.

Witnesses:
 J. P. WHITNY,
 A. F. KERR.